(12) United States Patent
Oh et al.

(10) Patent No.: US 11,495,034 B2
(45) Date of Patent: Nov. 8, 2022

(54) DEVICE AND METHOD FOR RECOGNIZING MOTION IN VEHICLE

(71) Applicants: HYUNDAI MOTOR COMPANY, Seoul (KR); KIA MOTORS CORPORATION, Seoul (KR)

(72) Inventors: Se Min Oh, Incheon (KR); Young Sung Joo, Goyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 352 days.

(21) Appl. No.: 16/700,079

(22) Filed: Dec. 2, 2019

(65) Prior Publication Data

US 2021/0042544 A1    Feb. 11, 2021

(30) Foreign Application Priority Data

Aug. 8, 2019    (KR) .................. 10-2019-0096900

(51) Int. Cl.
*G06F 3/01*    (2006.01)
*B60K 35/00*    (2006.01)
*G06V 20/59*    (2022.01)
*H04N 19/543*    (2014.01)

(52) U.S. Cl.
CPC ............ *G06V 20/597* (2022.01); *B60K 35/00* (2013.01); *G06F 3/017* (2013.01); *H04N 19/543* (2014.11); *B60K 2370/1464* (2019.05)

(58) Field of Classification Search
CPC ...... G06V 20/597; G06V 10/22; G06V 40/20; G06V 20/59; B60K 35/00; B60K 2370/1464; G06F 3/017; H04N 19/543; B60W 50/08; B60W 40/08; B60W 2050/009; B60W 2420/42; B60W 2540/30; B60W 2556/50; B60R 21/01542
See application file for complete search history.

(56) References Cited

U.S. PATENT DOCUMENTS

| 8,942,881 | B2 * | 1/2015 | Hobbs | G06V 40/28 701/1 |
|---|---|---|---|---|
| 10,180,729 | B2 | 1/2019 | Park | |
| 11,112,875 | B1 * | 9/2021 | Zhou | G06F 3/0304 |
| 2011/0254956 | A1 * | 10/2011 | Ishikawa | B60W 50/14 348/148 |
| 2014/0365228 | A1 * | 12/2014 | Ng-Thow-Hing | G06F 3/017 704/275 |
| 2014/0365979 | A1 * | 12/2014 | Yoon | H04M 1/72412 715/863 |
| 2015/0105976 | A1 * | 4/2015 | Shikii | B60H 1/00742 701/36 |

(Continued)

FOREIGN PATENT DOCUMENTS

KR    10-1556521 B    10/2015

*Primary Examiner* — Ibrahim A Khan (74) *Attorney, Agent, or Firm* — Morgan, Lewis & Bockius LLP (57) ABSTRACT

A device for recognizing a motion in a vehicle according to an embodiment of the present disclosure may include a camera for acquiring a user image, and a controller that divides the user image into a first region, a second region, and a third region in which the first region and the second region overlap each other, and recognizes a motion of a user occurring in at least one of the first region, the second region, or the third region.

20 Claims, 9 Drawing Sheets

(56) References Cited

U.S. PATENT DOCUMENTS

| | | | |
|---|---|---|---|
| 2015/0131857 A1* | 5/2015 | Han | G06V 20/597 |
| | | | 382/103 |
| 2015/0212584 A1* | 7/2015 | Aoyama | G06V 20/59 |
| | | | 345/173 |
| 2015/0266377 A1* | 9/2015 | Hampiholi | B60K 35/00 |
| | | | 455/466 |
| 2016/0016473 A1* | 1/2016 | Van Wiemeersch | G01G 19/4142 |
| | | | 701/36 |
| 2016/0098088 A1* | 4/2016 | Park | B60K 35/00 |
| | | | 345/156 |
| 2016/0159218 A1* | 6/2016 | Kang | B60K 35/00 |
| | | | 701/36 |
| 2017/0076606 A1* | 3/2017 | Gupta | B60K 35/00 |
| 2017/0083777 A1* | 3/2017 | Arata | G06V 40/28 |
| 2018/0208017 A1* | 7/2018 | Hernandez | B60K 37/02 |
| 2018/0251122 A1* | 9/2018 | Golston | B60W 50/0098 |
| 2019/0094038 A1* | 3/2019 | Oh | G01C 21/3608 |
| 2019/0342622 A1* | 11/2019 | Carrigan | H04N 21/21805 |
| 2020/0031228 A1* | 1/2020 | Nishio | B60K 35/00 |

\* cited by examiner

FIRST CAMERA

112

SECOND CAMERA

DEVICE AND METHOD FOR RECOGNIZING MOTION IN VEHICLE

CROSS-REFERENCE TO RELATED APPLICATION

The present application claims the benefit of priority to Korean Patent Application No. 10-2019-0096900, filed on Aug. 8, 2019, the entire contents of which are incorporated herein by reference.

FIELD

The present disclosure relates to a device and a method for recognizing a motion in a vehicle.

BACKGROUND

The statements in this section merely provide background information related to the present disclosure and may not constitute prior art.

A device control technology using motion recognition has recently been introduced into a vehicle. Some vehicle manufacturers have even made mass production of a vehicle equipped with the motion recognition technology using a camera. Users may use the motion recognition technology to more conveniently control various devices in the vehicle.

However, a recognition rate of the motion recognition technology is still low, and misrecognition occurs when motions generated from a plurality of users in the vehicle are recognized.

SUMMARY

The present disclosure has been made to address the above-mentioned problems occurring in the prior art while advantages achieved by the prior art are maintained intact.

An aspect of the present disclosure provides a device and a method for recognizing a motion in a vehicle that may recognize motions generated from a plurality of users in the vehicle.

Another aspect of the present disclosure provides a device and a method for recognizing a motion in a vehicle that may improve a recognition rate of a motion generated from a user in the vehicle.

Technical problems to be addressed by the present inventive concept are not limited to the aforementioned problems, and any other technical problems not mentioned herein will be clearly understood from the following description by those skilled in the art to which the present disclosure pertains.

In one aspect of the present disclosure, a device for recognizing a motion in a vehicle is provided. One form of a device includes a camera configured to acquire a user image, and a controller that is configured to divide the user image into a first region, a second region, and a third region in which the first region and the second region overlap each other, and to recognize a motion of a user occurring in at least one of the first region, the second region, or the third region.

In some implementations, the first region may include a first main region and a first sub region, and the second region includes a second main region and a second sub region.

In some implementations, the controller may assign a higher priority to a motion of the user recognized in the first main region than a motion of the user recognized in the first sub region, and assign a higher priority to a motion of the user recognized in the second main region than a motion of the user recognized in the second sub region.

In some implementations, the controller may generate a control command corresponding to the recognized motion of the user based on the priority.

In some implementations, the controller may generate a corresponding control command when the motion of the user occurring in the first region is recognized as a motion associated with control of driving of the vehicle, and not generate the control command when the motion of the user occurring in the second region is recognized as the motion associated with the control of the driving of the vehicle.

In some implementations, the controller may generate a corresponding control command when the motion of the user occurring in the second region is recognized as a motion associated with control of an infotainment system while the vehicle is traveling, and not generate the control command when the motion of the user occurring in the first region is recognized as the motion associated with the control of the infotainment system.

In some implementations, the controller may determine the motion of the user as a motion of a user in the first region or the second region when the motion of the user occurring in the third region is recognized, not generate a control command when the motion of the user is recognized as a motion associated with control of an infotainment system of the user in the first region, and generate the control command when the motion of the user is recognized as a motion associated with control of a navigation of the user in the second region.

In some implementations, the controller may determine priorities of the motion of the user recognized in the first region and the motion of the user recognized in the second region based on a traveling environment of the vehicle.

In some implementations, the controller may recognize at least one of a first motion of the user occurring in the first region, a second motion of the user occurring in the second region, or a third motion of the user occurring in the third region, and generate a corresponding control command when at least two of the first motion, the second motion, or the third motion correspond to a preset motion combination.

In some implementations, the controller may set a size or width of the first region, the second region, or the third region based on a frequency or pattern of the motion of the user occurring in at least one of the first region, the second region, or the third region.

In some implementations, the user may include a first user in a driver's seat and a second user in a passenger seat, wherein the first region may be defined as a region including the driver's seat, and wherein the second region may be defined as a region including the passenger seat.

In some implementations, the controller may recognize the motion of the user occurring in the third region as the motion of the user occurring in the first region or the second region based on a direction of entry of the motion of the user into the third region or a pre-stored user image.

In some implementations, the camera may include a first camera for capturing a user image of the first user, and a second camera for capturing a user image of the second user.

In some implementations, the controller may recognize the motion of the user occurring in at least one of the first region, the second region, or the third region based on priorities preset to the first region and the second region.

In another aspect of the present disclosure, a method for recognizing a motion in a vehicle is disclosed. In one form, a method includes acquiring, with a camera, a user image; dividing, with a controller, the user image into a first region, a second region, and a third region in which the first region and the second region overlap each other; and recognizing, with the controller, a motion of a user occurring in at least one of the first region, the second region, or the third region.

In some implementations, the first region may include a first main region and a first sub region and the second region may include a second main region and a second sub region.

In some implementations, the recognizing of the motion of the user occurring in at least one of the first region, the second region, or the third region may include assigning a higher priority to a motion of the user recognized in the first main region than a motion of the user recognized in the first sub region, and assigning a higher priority to a motion of the user recognized in the second main region than a motion of the user recognized in the second sub region.

In some implementations, recognizing of the motion of the user occurring in at least one of the first region, the second region, or the third region may include generating a corresponding control command when the motion of the user occurring in the first region is recognized as a motion associated with control of driving of the vehicle, and not generating the control command when the motion of the user occurring in the second region is recognized as the motion associated with the control of the driving of the vehicle.

In some implementations, recognizing the motion of the user occurring in at least one of the first region, the second region, or the third region may include generating a corresponding control command when the motion of the user occurring in the second region is recognized as a motion associated with control of an infotainment system while the vehicle is traveling, and not generating the control command when the motion of the user occurring in the first region is recognized as the motion associated with the control of the infotainment system.

In some implementations, recognizing the motion of the user occurring in at least one of the first region, the second region, or the third region may include recognizing the motion of the user occurring in at least one of the first region, the second region, or the third region based on priorities preset to the first region and the second region.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some embodiments and implementations of the present disclosure will be described in detail with reference to the exemplary drawings. In adding the reference numerals to the components of each drawing, it should be noted that the identical or equivalent component is designated by the identical numeral even when they are displayed on other drawings. Further, in describing embodiments and implementations of the present disclosure, a detailed description of the related known configuration or function will be omitted when it is determined that it interferes with the understanding of the embodiment of the present disclosure.

In describing the components of embodiments and implementations according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
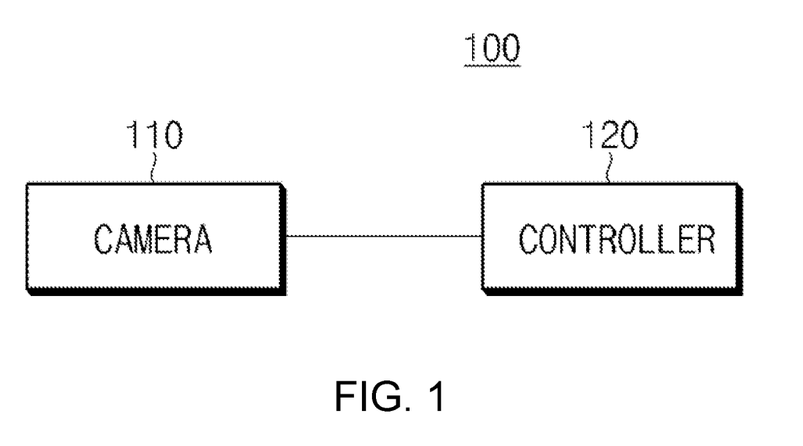
FIG. 1 is a block diagram illustrating one form of a motion recognition device of a vehicle.
Figure 2:
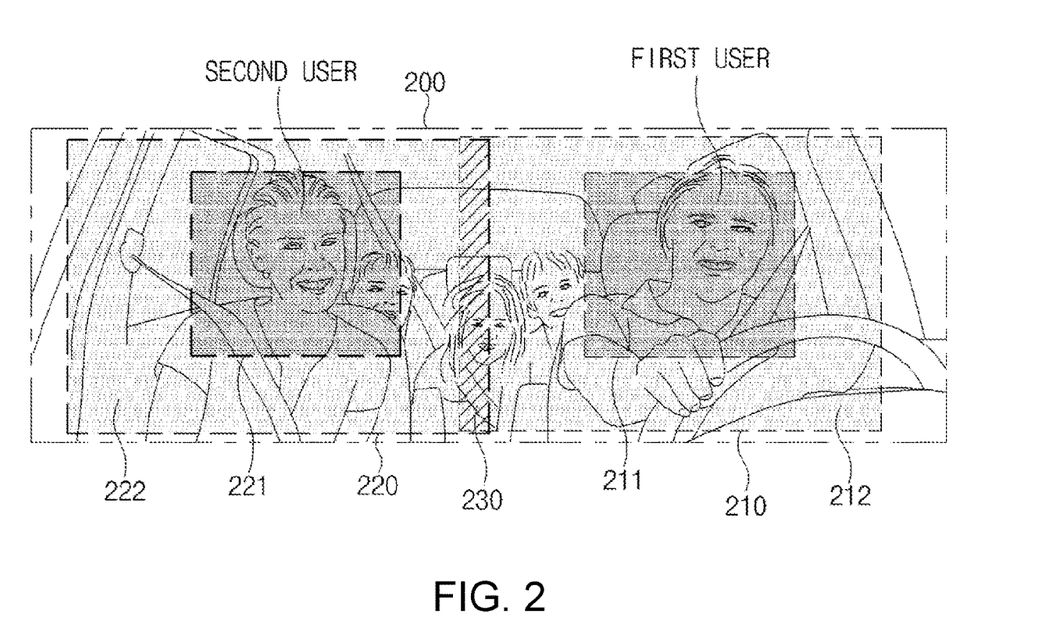
FIG. 2 illustrates an operation of a motion recognition device of a vehicle in a first region, a second region, and a third region of a user image.

FIG. 1 is a block diagram illustrating one form of a motion recognition device of a vehicle. FIG. 2 illustrates an operation of a motion recognition device of a vehicle in a first region, a second region, and a third region of a user image.

Referring to FIG. 1, a motion recognition device 100 of a vehicle may include a camera 110 and a controller 120.

The camera 110 may capture a user in the vehicle to acquire a user image. The user may include a first user in a driver's seat and a second user in a passenger seat. For example, the camera 110 may be disposed on a dashboard in the vehicle to capture the first user and the second user.

The controller 120 may use the user image to recognize a motion of the user. To this end, the controller 120 may divide the user image into a plurality of regions. For example, the controller 120 may divide the user image into a first region, a second region, and a third region. In this connection, the third region may be defined as a region in which the first region and the second region overlap each other. For example, the first region, which is a region including the driver's seat, may be defined as a polygonal, circular, elliptical region defined around the first user. The second region, which is a region including the passenger seat, may be defined as a polygonal, circular, or elliptical region defined around the second user.

The controller 120 may recognize a motion of the user occurring in at least one of the first region, the second region, or the third region. Thus, the controller 120 may recognize motions generated from a plurality of users in the vehicle. The controller 120 may recognize the user motion based on various well-known motion recognition algorithms.

Accordingly, the controller 120 may generate a control command based on the recognized user motion and may control various devices in the vehicle or operations of the devices using the control command.

Hereinafter, an operation of the controller 120 will be described in detail with reference to FIG. 2.

Referring to FIG. 2, an example of the user image acquired using the camera 110 is shown. As described above, the controller 120 may divide a user image 200 into a first region 210, a second region 220, and a third region 230.

The first region 210 may include a first main region 211 and a first sub region 212 and the second region 220 may include a second main region 221 and a second sub region 222. For example, the first main region 211 may be defined as a rectangular region defined around a face of the first user, and the first sub region 212 may be defined as the remaining region other than the first main region 211 in the first region 210. For example, the second main region 221 may be defined as a rectangular region defined around a face of the second user, and the second sub region 222 may be defined as the remaining region other than the second main region 221 in the second region 220.

The controller 120 may assign a higher priority to a motion of the user recognized in the first main region 211 than a motion of the user recognized in the first sub region 212 (e.g., the motion of the first user). The controller 120 may assign a higher priority to a motion of the user recognized in the second main region 221 than a motion of the user recognized in the second sub region 222.

For example, when a motion of lowering a volume of an audio device (e.g., infotainment system) in the vehicle is recognized from the first user in the first sub region 212 and a motion of increasing the volume of the audio device in the vehicle is recognized from the first user in the first main region 211, the controller 120 may generate the control command based on the motion of increasing the volume of the audio device of the vehicle recognized in the first main region 211.

When the motion of the user occurring in the first region 210 is recognized as a motion associated with control of driving of the vehicle, the controller 120 may generate a control command corresponding thereto. Further, when the motion of the user occurring in the second region 220 is recognized as a motion related to the motion associated with the control of the driving of the vehicle, the controller 120 may not generate the control command. That is, the controller 120 may recognize the motion of the first user prior to the motion of the second user with respect to the motion associated with the control of the driving of the vehicle. This is to support safe driving of the vehicle by ensuring a priority of the first user, that is, a driver, with respect to the control of the driving of the vehicle. For example, the motion associated with the control of the driving of the vehicle may include, but is not limited to, shift control of the vehicle, speed control, control of operations of driving assistance devices, and the like.

For example, when a shift control motion (e.g., a motion of changing a gear stage) is recognized in the first region 210, the controller 120 may generate a control command corresponding thereto. However, when the shift control motion is recognized in the second region 220, the controller 120 may not generate a control command corresponding thereto.

While the vehicle is traveling, when the motion of the user occurring in the second region 220 is recognized as a motion associated with navigation control (e.g., control related to the infotainment system of the vehicle), the controller 120 may generate a corresponding control command. Further, when the motion of the user occurring in the first region 210 is recognized as the motion associated with the navigation control, the controller 120 may not generate the control command. That is, when a user motion related to a control command (e.g., a motion for inputting a navigation destination while the vehicle is traveling) that cannot be manipulated by the first user is recognized in the first region 210, the controller 120 may not generate a control command. In one example, the user motion associated with the control command that cannot be manipulated by the first user may further include a user motion for Bluetooth connection in addition to the motion for the destination input described above.

The controller 120 may determine priorities of the motion of the user recognized in the first region 210 and the motion of the user recognized in the second region 220 based on a traveling environment of the vehicle.

For example, when a speed of the vehicle is equal to or above a certain speed (e.g., 100 km/h), the controller 120 may recognize the motion of the user recognized in the second region 220 prior to the motion of the user recognized in the first region 210 for safety. In addition, for example, when the driving assistance device of the vehicle is in operation, the controller 120 may recognize the motion of the user recognized in the first region 210 prior to the motion of the user recognized in the second region 220 even when the speed of the vehicle is equal to or greater than a certain speed.

The controller 120 may recognize a first motion of the user occurring in the first region 210, a second motion of the user occurring in the second region 220, and a third motion of the user occurring in the third region 230, and, when at least two of the first motion, the second motion, or the third motion correspond to a preset motion combination, the controller 120 may generate a control command corresponding thereto. For example, the preset motion combination may include various combinations, such as a case in which the first motion is 'O' and the second motion is 'Δ'. When the first motion and the second motion correspond to the preset motion combination, the controller 120 may improve a convenience of the user and generate interest by generating a control command for executing various functions, such as playing music, outputting a user setting screen, and the like.

When the motion of the user is occurring in the third region 230, the controller 120 may recognize the motion of the user occurring in the third region 230 as the motion of the user occurring in the first region 210 or the second region 220 based on a direction of entry of the user's motion into the third region 230 or a matching result with a pre-stored user image (e.g., identifying whom the user's hand belongs to by analyzing an image). For example, the controller 120 may recognize the motion generated by the hand of the user entering the third region 230 from the first region 210 as the motion of the first user, and, therefore, recognize the motion generated by the hand of the user as the motion of the user occurring in the first region 210.

For example, when the motion of the user occurring in the third region 230 is recognized, the controller 120 may determine the motion of the user as the motion of the user seated in the first region 210 or the second region 220. When the motion of the user is recognized as a motion associated with the navigation control of the user seated in the first region 210, the controller 120 may not generate a control command. Further, when the motion of the user is recognized as a motion associated with the navigation control of the user seated in the second region 220, the controller 120 may generate the control command.

The controller 120 may recognize the motion of the user occurring in at least one of the first region 210, the second region 220, or the third region 230 based on priorities preset on the first region 210 and the second region 220. To this end, the controller 120 may assign priorities to the first region 210 and the second region 220 for a region in which the motion of the user corresponding to the control command for executing a specific function of the vehicle is recognized. For example, the controller 120 may assign a higher priority to the first region 210 than the second region 220 in a case in which the motion of the user corresponding to the control command for operating the infotainment system of the vehicle is recognized.

Figure 3:
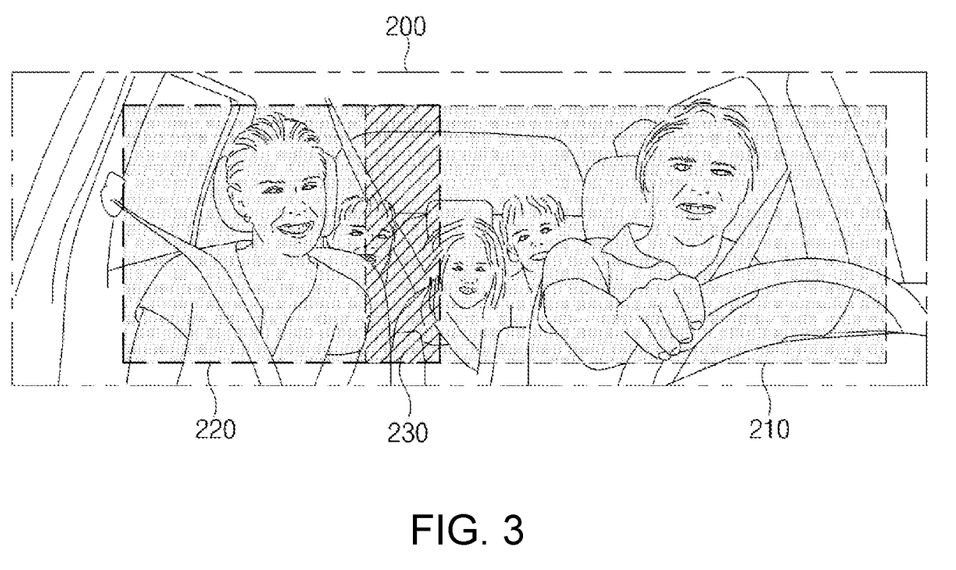
FIGS. 3 to 5 are diagrams for illustrating a change in a third region.
Figure 4:
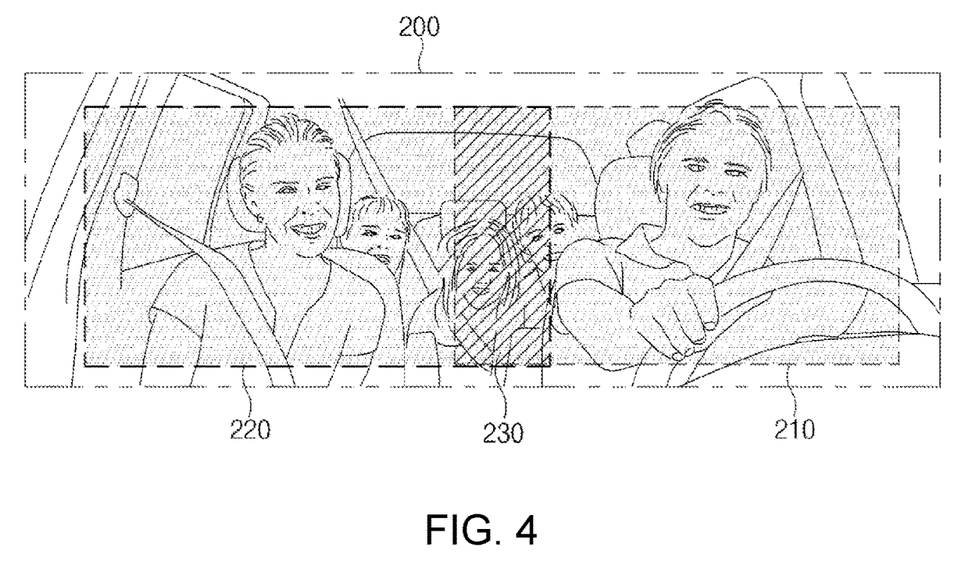
Figure 5:
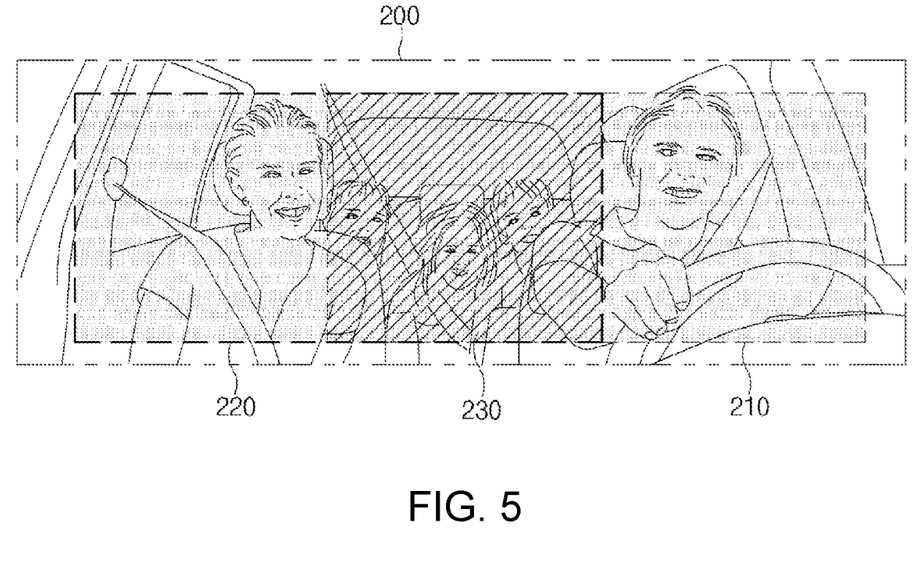

FIGS. 3 to 5 are diagrams for illustrating a change in a third region.

Referring to FIGS. 3 to 5, the controller 120 may determine a size or width of the first region 210, the second region 220, or the third region 230 based on a frequency or pattern of a motion of the user occurring in at least one of the first region 210, the second region 220, or the third region 230. For example, the controller 120 may obtain the frequency or pattern information of the user's motion through a user's input or communication with other devices, or accumulate and analyze a user image acquired for a predetermined period of time via the camera 110 to generate the frequency or pattern information of the user's motion.

For example, referring to FIG. 3, when a frequency of the motion of the user occurring in the first region 210 is higher than a frequency of the motion of the user occurring in the second region 220, the controller 120 may determine the first region 210 to be wider than the second region 220.

For example, referring to FIG. 4, when a distribution of positions where the motions of the user occurring in the first region 210 and the second region 220 is sporadic (that is, when the pattern of the motion of the user is sporadic), the controller 120 may enlarge the size or width of the first region 210 and the second region 220.

In addition, for example, when a frequency of the motion of the user occurring in the third region 230 is higher than the frequencies of the motions occurring in the first region 210 and the second region 220, the controller 120 may set the third region 230 to be the widest. This may be achieved by enlarging a region where the first region 210 and the second region 220 overlap.

As described above, the controller 120 may improve a motion recognition rate by adaptively determining the sizes or widths of the first region 210, the second region 220, and the third region 230.

Figure 6:
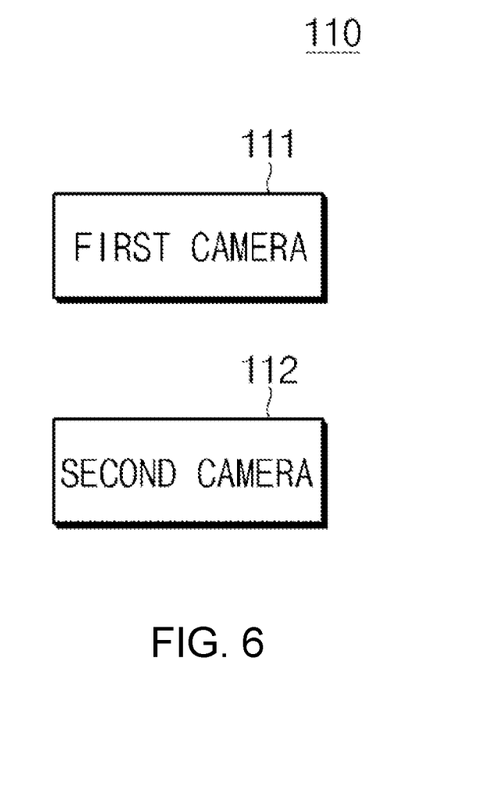
FIG. 6 is a block diagram illustrating another form of a motion recognition device of a vehicle.

FIG. 6 is a block diagram illustrating another form of a camera of a motion recognition device of a vehicle.

Referring to FIG. 6, the camera 110 of the motion recognition device of the vehicle may include a first camera 111 and a second camera 112.

The first camera 111 may acquire a user image of the first user (e.g., driver).

The second camera 112 may acquire a user image of the second user (e.g., passenger sitting in the passenger seat).

As such, the camera 110 of the motion recognition device of the vehicle may include the first camera 111 and the second camera 112 to acquire the user image for each user, thereby more improving the motion recognition rate.

Figure 7:
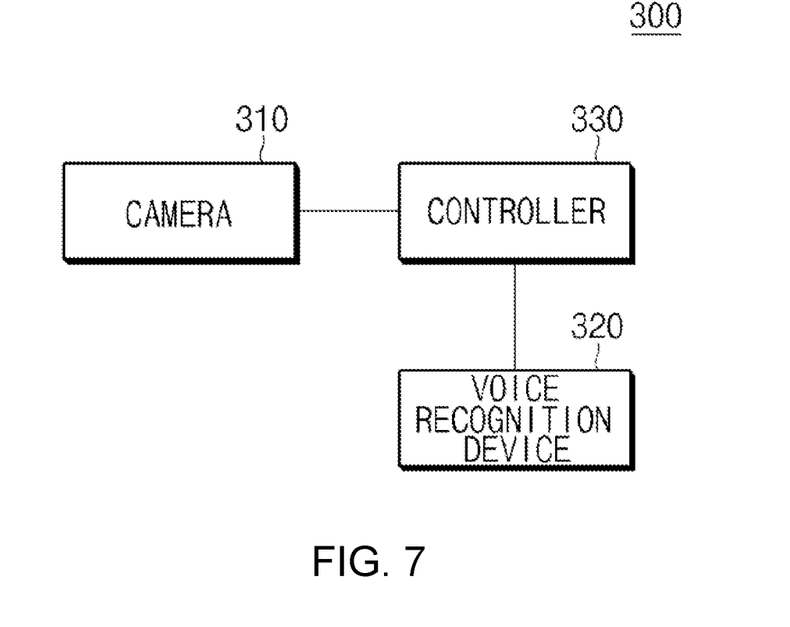
FIG. 7 is a block diagram illustrating another form of a motion recognition device of a vehicle.

FIG. 7 is a block diagram illustrating another form of a motion recognition device of a vehicle.

Referring to FIG. 7, a motion recognition device 300 of the vehicle may include a camera 310, a voice recognition device 320, and a controller 330. In this connection, the camera 310 may be substantially the same as the camera 110 described with reference to FIGS. 1 and 6, and thus redundant description thereof will be omitted.

The voice recognition device 320 may recognize an input voice of the user. For example, the voice recognition device 320 may identify the user based on the input voice of the user, and may analyze an emotional state of the user, a relationship between the users, a gender of the user, and the like.

The controller 330 may set the priorities regarding the recognition of the motion of the user in the first region 210 and the second region 220 based on the user recognition result, the emotional state of the user, the relationship between the users, the gender of the user, and the like delivered from the voice recognition device 320. For example, when the first user is older than the second user or takes control of the conversation, the controller 330 may assign a higher priority to the first region 210 than the second region 220. Further, for example, when the second user is female and the first user is male, the controller 330 may assign a higher priority to the second region 220 than the first region 210.

The controller 330 may assign the priorities regarding the recognition of the motion of the user in the first region 210 and the second region 220 based on the user image transmitted from the camera 310. For example, when a first user motion recognition is more urgent in an analysis result of facial expression or the like of the user shown in the user image, the controller 330 may assign a higher priority to the first region 210 than the second region 220.

Therefore, according to the motion recognition device 300 of the vehicle according to another embodiment of the present disclosure, the user motion recognition may be achieved adaptively for various situations, and thus convenience of the user may be improved and the motion recognition rate may also be improved.

Figure 8:
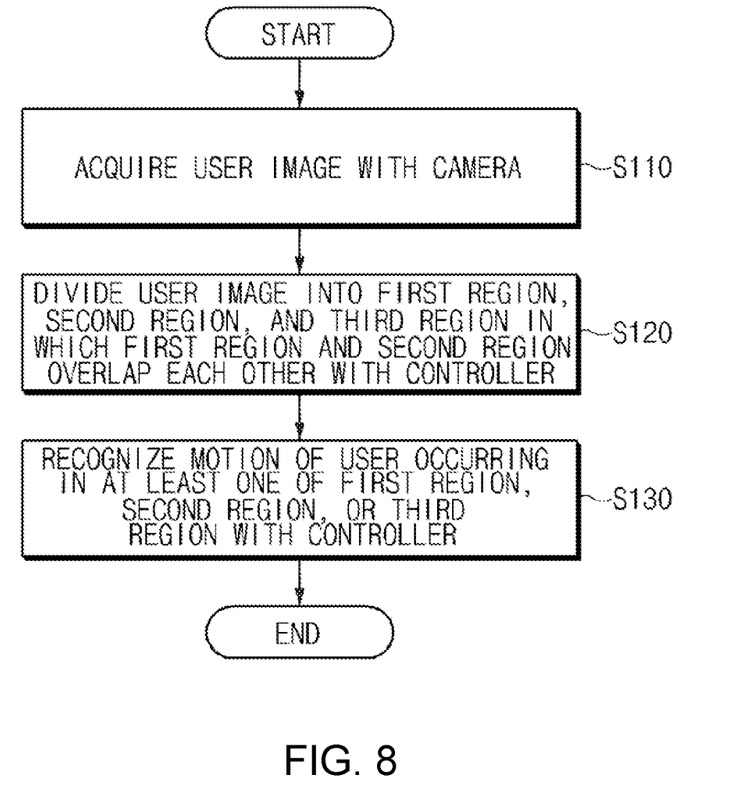
FIG. 8 is a flowchart illustrating one form of a method for recognizing a motion in a vehicle.

FIG. 8 is a flowchart illustrating a method for recognizing a motion in a vehicle according to an embodiment of the present disclosure.

Referring to FIG. 8, the method for recognizing the motion in the vehicle according to an embodiment of the present disclosure may include acquiring the user image (S110), dividing the user image into the first region, the second region, and the third region in which the first region and the second region overlap each other (S120), and recognizing the motion of the user occurring in at least one of the first region, the second region, or the third region (S130).

Hereinafter, the operations S110 to S130 described above will be described in detail with reference to FIGS. 1 and 2.

In S110, the camera 110 may capture the user in the vehicle to acquire the user image. The user may include the first user in the driver's seat and the second user in the passenger seat.

In S120, the controller 120 may divide the user image into the plurality of regions. For example, the controller 120 may divide the user image into the first region, the second region, and the third region. In this connection, the third region may be defined as the region in which the first region and the second region overlap each other. For example, the first region, which is the region including the driver's seat, may be defined as the polygonal, circular, elliptical region defined around the first user. The second region, which is the region including the passenger seat, may be defined as the polygonal, circular, or elliptical region defined around the second user.

In S130, the controller 120 may recognize the motion of the user occurring in at least one of the first region, the second region, or the third region. Thus, the controller 120 may recognize the motion generated from the plurality of users in the vehicle. The controller 120 may recognize the user motion based on the various well-known motion recognition algorithms. The controller 120 may generate the control command based on the recognized user motion, and control the various devices in the vehicle and the operations of the devices using the control command.

In one example, the first region 210 may include the first main region 211 and the first sub region 212 and the second region 220 may include the second main region 221 and the second sub region 222.

The controller 120 may assign the higher priority to the motion of the user recognized in the first main region 211 than the motion of the user recognized in the first sub region 212 (e.g., the motion of the first user). The controller 120 may assign the higher priority to the motion of the user recognized in the second main region 221 than the motion of the user recognized in the second sub region 222.

When the motion of the user occurring in the first region 210 is recognized as the motion associated with the control of the driving of the vehicle, the controller 120 may generate the control command corresponding thereto. Further, when the motion of the user occurring in the second region 220 is recognized as the motion related to the motion associated with the control of the driving of the vehicle, the controller 120 may not generate the control command. That is, the controller 120 may recognize the motion of the first user prior to the motion of the second user with respect to the motion associated with the control of the driving of the vehicle. This is to support the safe driving of the vehicle by ensuring the priority of the first user, that is, the driver, with respect to the control of the driving of the vehicle.

While the vehicle is traveling, when the motion of the user occurring in the second region 220 is recognized as the motion associated with navigation control, the controller 120 may generate the corresponding control command. Further, when the motion of the user occurring in the first region 210 is recognized as the motion associated with the navigation control, the controller 120 may not generate the control command. That is, when the user motion related to the control command (e.g., the motion for inputting the navigation destination while the vehicle is traveling) that cannot be manipulated by the first user is recognized in the first region 210, the controller 120 may not generate the control command.

The controller 120 may determine the priorities of the motion of the user recognized in the first region 210 and the motion of the user recognized in the second region 220 based on the traveling environment of the vehicle.

The controller 120 may recognize the first motion of the user occurring in the first region 210 and the second motion of the user occurring in the second region 220, and, when the first motion and the second motion correspond to the preset motion combination, the controller 120 may generate the control command corresponding thereto. For example, the preset motion combination may include the various combinations, such as the case in which the first motion is 'O' and the second motion is 'Δ'. When the first motion and the second motion correspond to the preset motion combination, the controller 120 may improve the convenience of the user and generate the interest by generating the control command for executing the various functions, such as playing music, outputting the user setting screen, and the like.

When the motion of the user is occurring in the third region 230, the controller 120 may recognize the motion of the user occurring in the third region 230 as the motion of the user occurring in the first region 210 or the second region 220 based on the direction of the entry of the user's motion into the third region 230 or the matching result with the pre-stored user image (e.g., identifying whom the user's hand belongs to by analyzing the image).

The controller 120 may recognize the motion of the user occurring in at least one of the first region 210, the second region 220, or the third region 230 based on the priorities preset on the first region 210 and the second region 220.

Figure 9:
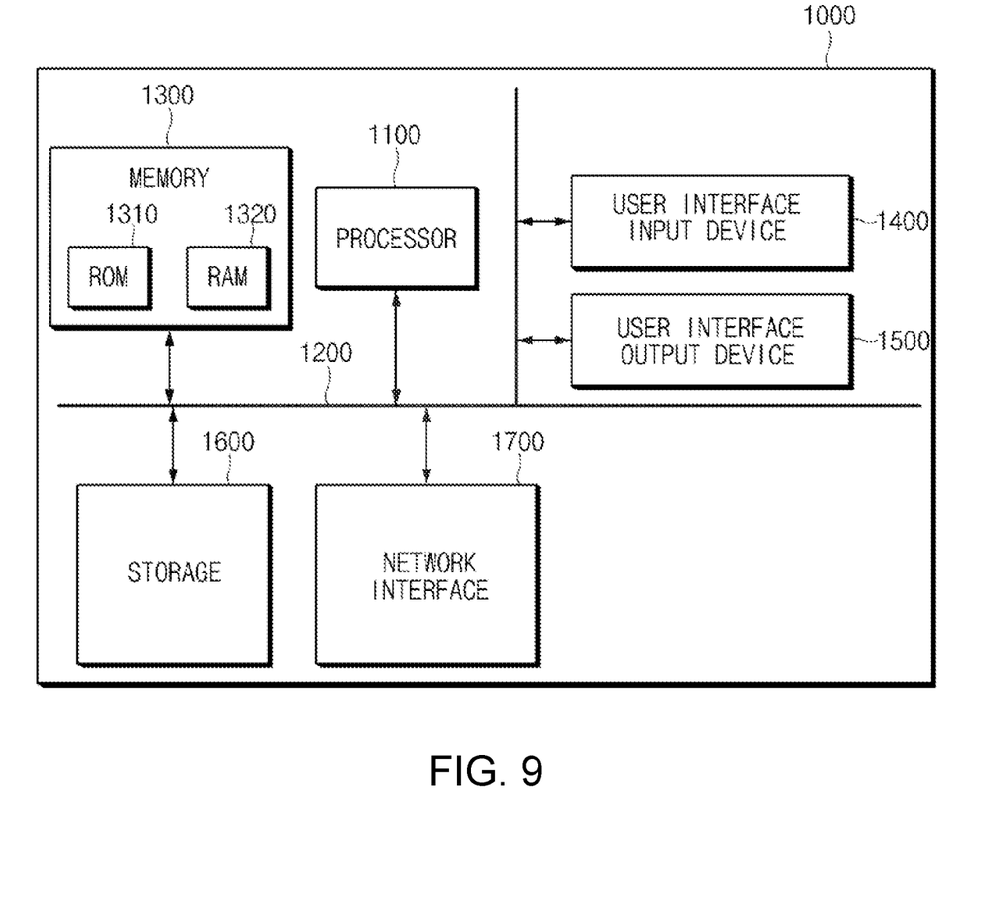
FIG. 9 illustrates one form of a computing system for executing a method for recognizing a motion in a vehicle.

FIG. 9 illustrates a computing system for executing one form of a method for recognizing a motion in the vehicle.

Referring to FIG. 9, forms of the method for recognizing the motion in the vehicle described above may also be implemented via the computing system. A computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments and implementations disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the device and the method for recognizing the motion in the vehicle according to an embodiment of the present disclosure, the motions generated from the plurality of users in the vehicle may be recognized.

According to the device and the method for recognizing the motion in the vehicle according to an embodiment of the present disclosure, the recognition rate of the motion generated from the user in the vehicle may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for recognizing a motion in a vehicle, the device comprising:
a camera configured to acquire a user image; and
a controller configured to:
divide the user image into a first region, a second region, and a third region in which the first region and the second region overlap each other, wherein the first region corresponds to a first user among a plurality of users, and the second area corresponds to a second user among the plurality of users; and
recognize a motion of a user among the plurality of users occurring in at least one of the first region, the second region, or the third region,
wherein the controller is further configured to:
determine priorities of a motion of the first user recognized in the first region and a motion of the second user recognized in the second region based on a speed of the vehicle, and
recognize the motion of the second user recognized in the second region prior to the motion of the first user recognized in the first region, when the speed of the vehicle is above a predetermined speed, based on the determined priorities.

2. The device of claim 1, wherein:
the first region includes a first main region and a first sub region, and
the second region includes a second main region and a second sub region.

3. The device of claim 2, wherein the controller is configured to:
assign a higher priority to a motion of the first user recognized in the first main region than a motion of the first user recognized in the first sub region; and
assign a higher priority to a motion of the second user recognized in the second main region than a motion of the second user recognized in the second sub region.

4. The device of claim 3, wherein the controller is configured to generate a control command corresponding to the recognized motion of the user based on the priorities.

5. The device of claim 1, wherein the controller is configured to:
generate a corresponding control command when the motion of the first user occurring in the first region is recognized as a motion associated with control of driving of the vehicle; and
not generate the control command when the motion of the second user occurring in the second region is recognized as the motion associated with the control of the driving of the vehicle.

6. The device of claim 1, wherein the controller is configured to:
generate a corresponding control command when the motion of the second user occurring in the second region is recognized as a motion associated with control of an infotainment system while the vehicle is traveling; and
not generate the control command when the motion of the first user occurring in the first region is recognized as the motion associated with the control of the infotainment system.

7. The device of claim 1, wherein the controller is configured to:
determine the motion of the user as the motion of the first user in the first region or the motion of the second user in the second region when the motion of the user occurring in the third region is recognized;
not generate a control command when the motion of the user is recognized as a motion associated with control of an infotainment system of the first user in the first region; and
generate the control command when the motion of the user is recognized as a motion associated with control of a navigation of the second user in the second region.

8. The device of claim 1, wherein the controller is configured to:
determine the priorities of the motion of the first user recognized in the first region and the motion of the second user recognized in the second region based on a traveling environment of the vehicle.

9. The device of claim 1, wherein the controller is configured to:
recognize at least one of a first motion of the user occurring in the first region, a second motion of the user occurring in the second region, or a third motion of the user occurring in the third region; and
generate a corresponding control command when at least two of the first motion, the second motion, or the third motion correspond to a preset motion combination.

10. The device of claim 1, wherein the controller is configured to:
set a size or width of the first region, the second region, or the third region based on a frequency or pattern of the motion of the user occurring in the at least one of the first region, the second region, or the third region.

11. The device of claim 1, wherein:
the first user includes a user in a driver's seat and the second user includes a user in a passenger seat,
the first region is defined as a region including the driver's seat, and
the second region is defined as a region including the passenger seat.

12. The device of claim 11, wherein the controller is configured to recognize the motion of the user occurring in the third region as the motion of the first user occurring in the first region or the motion of the second user occurring in the second region based on a direction of entry of the motion of the user into the third region or a pre-stored user image.

13. The device of claim 11, wherein the camera includes:
a first camera configured to capture a user image of the first user; and
a second camera configured to capture a user image of the second user.

14. The device of claim 1, wherein the controller is configured to recognize the motion of the user occurring in the at least one of the first region, the second region, or the third region based on priorities preset to the first region and the second region.

15. A method for recognizing a motion in a vehicle, the method comprising:
acquiring, with a camera, a user image;
dividing, with a controller, the user image into a first region, a second region, and a third region in which the first region and the second region overlap each other, wherein the first region corresponds to a first user among a plurality of users, and the second area corresponds to a second user among the plurality of users; and
recognizing, with the controller, a motion of a user among the plurality of users occurring in at least one of the first region, the second region, or the third region,
wherein the recognizing of the motion of the user occurring in the at least one of the first region, the second region, or the third region includes:
determining priorities of a motion of the first user recognized in the first region and a motion of the second user recognized in the second region based on a speed of the vehicle, and
recognizing, with the controller, the motion of the second user recognized in the second region prior to the motion of the first user recognized in the first region, when the speed of the vehicle is above a predetermined speed, based on the determined priorities.

16. The method of claim 15, Wherein:
the first region includes a first main region and a first sub region, and
the second region includes a second main region and a second sub region.

17. The method of claim 16, wherein the recognizing of the motion of the user occurring in the at least one of the first region, the second region, or the third region includes:
assigning a higher priority to a motion of the first user recognized in the first main region than a motion of the first user recognized in the first sub region; and
assigning a higher priority to a motion of the second user recognized in the second main region than a motion of the second user recognized in the second sub region.

18. The method of claim 15, wherein the recognizing of the motion of the user occurring in the at least one of the first region, the second region, or the third region includes:
generating a corresponding control command when the motion of the first user occurring in the first region is recognized as a motion associated with control of driving of the vehicle; and
not generating the control command when the motion of the second user occurring in the second region is recognized as the motion associated with the control of the driving of the vehicle.

19. The method of claim 15, wherein the recognizing of the motion of the user occurring in the at least one of the first region, the second region, or the third region includes:
generating a corresponding control command when the motion of the second user occurring in the second region is recognized as a motion associated with control of an infotainment system while the vehicle is traveling; and
not generating the control command when the motion of the first user occurring in the first region is recognized as the motion associated with the control of the infotainment system.

20. The method of claim 15, wherein the recognizing of the motion of the user occurring in the at least one of the first region, the second region, or the third region includes:
recognizing the motion of the user occurring in the at least one of the first region, the second region, or the third region based on priorities preset to the first region and the second region.

* * * * *